United States Patent
Abe et al.

(10) Patent No.: US 6,920,267 B2
(45) Date of Patent: Jul. 19, 2005

(54) OPTICAL COUPLING DEVICE AND MANUFACTURING METHOD THEREOF

(75) Inventors: Munemitsu Abe, Miyagi-ken (JP); Eiji Shinohara, Miyagi-ken (JP)

(73) Assignee: Alps Electric Co., LTD, Tokyo (JP)

( * ) Notice: Subject to any disclaimer, the term of this patent is extended or adjusted under 35 U.S.C. 154(b) by 21 days.

(21) Appl. No.: 10/420,574

(22) Filed: Apr. 21, 2003

(65) Prior Publication Data

US 2003/0210868 A1 Nov. 13, 2003

(30) Foreign Application Priority Data

May 13, 2002 (JP) ........................................ 2002-136549

(51) Int. Cl.$^7$ ................................................. G02B 6/00
(52) U.S. Cl. ........................................................ 385/52
(58) Field of Search ........................................... 385/52

(56) References Cited

U.S. PATENT DOCUMENTS

| 4,210,923 A | * | 7/1980 | North et al. ................. 257/432 |
| 5,384,872 A | * | 1/1995 | Jacobs-Cook et al. ......... 385/31 |
| 5,757,999 A |   | 5/1998 | Tabuchi et al. |
| 5,883,411 A | * | 3/1999 | Ueda et al. .................. 257/331 |
| 6,383,403 B1 | * | 5/2002 | Sekiya et al. .................. 216/70 |
| 2002/0048436 A1 | * | 4/2002 | Nishikawa et al. ............ 385/88 |

FOREIGN PATENT DOCUMENTS

| EP | 395 854 A | 11/1990 | ............ G02B/6/42 |
| EP | 0 869 379 A1 | 10/1998 | ............ G02B/6/42 |
| JP | 2982861 | 9/1999 | |

OTHER PUBLICATIONS

Copy of European Search Report dated Nov. 16, 2004, from corresponding European Application No. 03252927.3.

* cited by examiner

*Primary Examiner*—John Lee
*Assistant Examiner*—Phillip A Johnston
(74) *Attorney, Agent, or Firm*—Beyer Weaver & Thomas LLP

(57) ABSTRACT

When a guide groove for a lens is formed in a single crystal silicon substrate, a rectangular parallelepiped opening is formed having a width smaller than a desired width of the guide groove and is then processed by wet etching using a KOH solution. Two {111} planes are exposed on at least one end surface of the guide groove in an optical axis direction, and the planes described above are inclined toward the substrate side from the upper and the lower sides. Since a protrusion portion protruding to the guide groove side is not provided at the bottom part of the end surface, a light-emitting diode and a lens can be disposed close to each other, thereby forming an optical coupling device having high optical coupling efficiency obtained between elements.

8 Claims, 6 Drawing Sheets

US 6,920,267 B2

OPTICAL COUPLING DEVICE AND MANUFACTURING METHOD THEREOF

BACKGROUND OF THE INVENTION

1. Field of the Invention

The present invention relates to optical coupling devices in which optical coupling between an optical element such as a light-emitting element or a light-receiving element and another optical element such as an optical fiber or a lens can be realized with high efficiency and relates to manufacturing methods thereof.

2. Description of the Related Art

Referring to FIGS. 7 and 8, the case in which a laser diode (hereinafter referred to as "LD") which is a light-emitting element is coupled with a lens will be described as an example of a related technique. As the optical coupling device described above, a technique has been well known in which a guide groove having two tapered side surfaces decreasing the distance therebetween in the depth direction is formed in a silicon (Si) substrate for alignment, and a lens is fixed in the guide groove and is then coupled with an optical element. FIG. 7 is a perspective view of an optical coupling device 80 as described above, and FIG. 8 is a cross-sectional view taken along the line 8—8 in FIG. 7 and showing the state in which a lens 35 is placed in a guide groove 33. In FIG. 8, the line X—X indicates an optical axis.

As shown in FIGS. 7 and 8, in the surface of a Si substrate 31, the guide groove 33 holding the lens 35 is formed, and on a surface of the Si substrate 31, which is in the vicinity of the end portion of the groove 33, an LD 32 is disposed. For forming the guide groove 33, anisotropic wet etching is used which can easily perform highly accurate fine etching. When a substrate having a {100} plane on a surface is used as the Si substrate 31 and is then etched by using a mask having a rectangular opening in which one side thereof is formed along the optical axis direction, due to the difference in etching rate between individual crystal planes of the Si substrate 31, the guide groove 33 having tapered side surfaces 37 and 38 decreasing the distance therebetween in the depth direction is formed. The side surfaces 37 and 38 both have {111} planes. When the lens 35 is fixed to the guide groove 33, the position of the lens 35 in the radial direction is determined so that the optical axis thereof is aligned with that of the LD 32, and as a result, the optical coupling between the LD 32 and the lens 35 can be realized.

A method for representing a crystal plane using braces { } such as a {111} plane is generally used for denoting crystallographically equivalent planes having different directions.

However, according to the technique described above, since a {111} crystal plane 34 (an inclined angle θ of 54.7°) is formed at an end portion of the guide groove 33, due to the presence of this {111} crystal plane 34, the LD 32 and the lens 35 cannot be disposed close to each other. That is, since the Si crystal is composed of a single element, only one type of {111} plane forms the guide groove. Hence, as is the side surface, the {111} plane is also formed at the end portion of the guide groove, and since this end portion has a tapered shape protruding toward the lens 35, there has been a limitation on decrease in distance between the LD 32 and the lens 35. For example, when the lens 35 having an outside diameter of 1,000 μm is used, the distance between the LD 32 and the lens 35 is increased to approximately 350 μm, and as a result, the optical coupling efficiency between the LD 32 and the lens 35 is extremely decreased.

In the optical coupling device described above, as a technique in which the distance between the LD 32 and the lens 35 is decreased, a mechanical machining technique has been disclosed in which the {111} plane 34 at the end portion of the guide groove 33 is ground in an approximately vertical direction by dicing. In addition, as a chemical wet etching method, a technique has been well known in which an end surface recessed in the optical axis direction is formed so as to have a V-shape by using a gallium arsenide (GaAs) substrate having two types of {100} planes. In this case, at the end portion of the guide groove, two types of {100} planes 39a and 39b, which are indicated by a two-dot chain line in FIG. 8, appear. According to the techniques described above, the end portion of the lens 35 can be disposed close to the LD 32, and the techniques are effectively used for improving the optical coupling efficiency.

However, the proposed techniques described above have the following problems. In the former technique, which is the mechanical machining technique, it has been difficult to perform alignment with sufficient accuracy. In addition, since the groove formed by dicing is below the bottom surface of the guide groove, the mechanical strength is decreased, and as a result, breakage may frequently occur in a subsequent element assembly step. Furthermore, since the machining can only be performed in the direction so as to traverse the substrate, part other than the guide groove is also ground, and as a result, formation of higher integration of elements on the silicon substrate will be considerably restricted thereby. On the other hand, according to the latter technique, which is the technique using a GaAs substrate, machining may be performed in a manner approximately equivalent to that for a silicon substrate; however, since a GaAs substrate is very brittle as compared to the silicon substrate, as is the case of the mechanical machining technique described above, breakage may frequently occur in an element assembly step.

SUMMARY OF THE INVENTION

The present invention was made to solve the problems described above, and an object of the present invention is to provide an optical coupling device and a manufacturing method thereof, in which optical coupling can be realized with a high efficiency by a simple anisotropic wet etching using a Si substrate.

An optical coupling device of the present invention, comprises: a single crystal silicon substrate having a {100} plane at a surface; and a guide groove formed in the silicon substrate, in which a first optical element placed in the guide groove is coupled with a second element placed at a position outside the guide groove so that the optical axis of the first optical element is aligned with that of the second optical element. In the optical coupling device described above, the optical axis has the direction in which a {110} plane is oriented, and at least one end surface of the guide groove in the optical axis direction is formed of two {111} planes which are in contact with each other along one line perpendicular to the optical axes and parallel to the surface at approximately a central portion in the depth direction of the guide groove.

The two {111} planes are inclined toward the central portion in the depth direction, in which one of the two {111} planes described above extends from the surface of the substrate and the other plane extends from the bottom surface of the guide groove, so as to increase the space inside the guide groove. That is, at least one end surface of the guide groove in the optical axis direction is composed of two parts inclined from the top and the bottom toward the substrate side, and the bottom part of the end surface has no protrusion portion protruding to the guide groove side. Accordingly, the optical elements can be disposed close to each other, and as a result, a highly efficient optical coupling can be realized as compared to a related example in which a silicon substrate is also used.

In the present invention, the cross-section of the guide groove perpendicular to the optical axis direction preferably has an inverted trapezoid shape, and both of the two side surfaces of the guide groove parallel to the optical axis preferably have {111} planes.

According to the structure described above, alignment in the direction perpendicular to the optical axis, for example, in the radial direction of a lens, can be very easily performed.

According to the present invention, the optical coupling device may further comprise an insulating film on the surface of the silicon substrate; and a metal wire film on the insulating film for the second optical element placed outside the guide groove.

According to the structure described above, a light-emitting or a light-receiving element, such as a laser diode (LD) or a photodiode (PD), can be placed while being reliably insulated from any part other than the metal wire portion.

A coupling module for optical communication, according to the present invention, comprises the optical coupling device described above, in which the first optical element described above is an optical lens, and the second optical element described above is a light-emitting element or a light receiving element. According to the structure described above, the optical coupling efficiency between the elements can be improved, and a compact coupling module for optical communication can be obtained in which communication loss is decreased.

A method for manufacturing an optical coupling device, according to the present invention, comprises the steps of: forming a rectangular parallelepiped opening portion in a surface of a single crystal silicon substrate having a {100} plane so that all two pairs of side surfaces opposing each other of the opening portion in the depth direction have {110} planes; and performing anisotropic wet etching for an area which includes the opening portion and is larger than the area thereof in the width direction so as to expose two {111} planes on at least one end surface of the opening portion in the direction in which a {110} plane is oriented, the two {111} planes being in contact with each other along one line which is perpendicular to the direction of the {110} orientation and is parallel to the surface described above, whereby the guide groove is formed.

According to the present invention, by using the difference in etching rate of individual crystal planes of the silicon substrate, the end surface of the guide groove in the optical axis direction, which has no protruding portion at the bottom part, can be easily formed with high accuracy, and hence elements can be disposed close to each other.

According to the present invention, the opening portion described above is preferably formed by reactive ion etching using sulfur hexafluoride ($SF_6$) and perfluoro-1-butene or perfluoro-2-butene or perfluorocyclobutane ($C_4F_8$).

Since superior alignment accuracy and anisotropic properties can be obtained by the RIE, an opening portion having a desired rectangular parallelepiped shape can be easily formed.

DESCRIPTION OF THE PREFERRED EMBODIMENTS

[First Embodiment]

Figure 1:
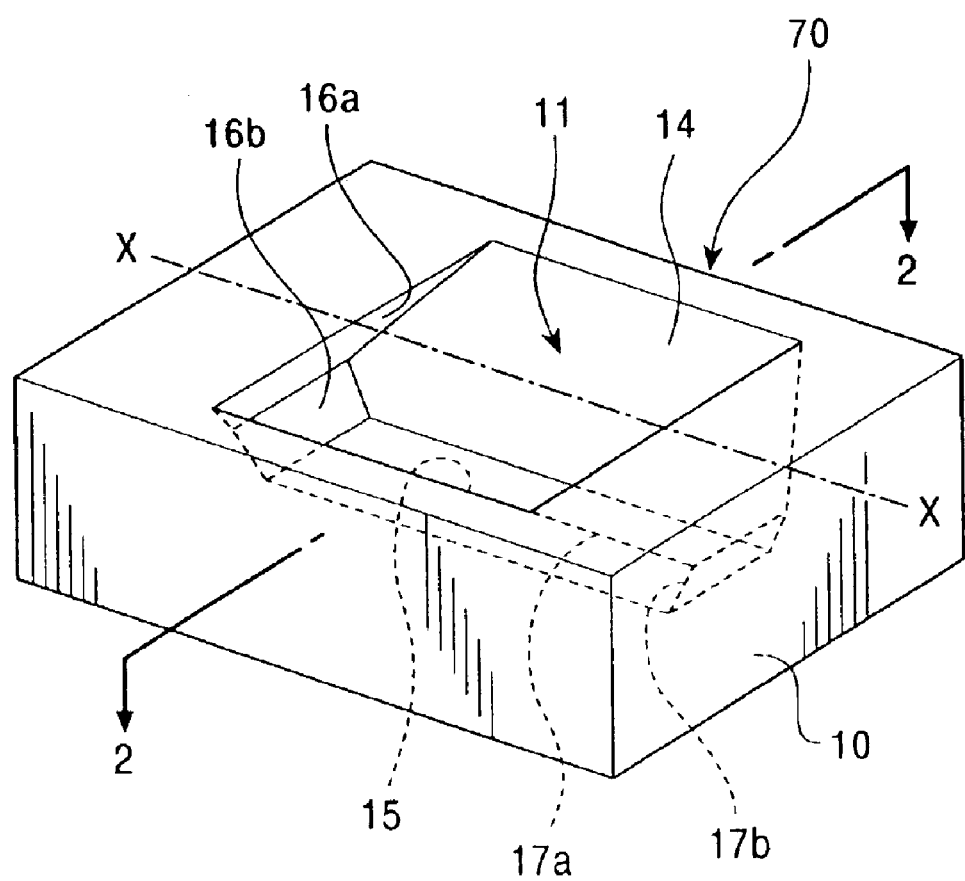
FIG. 1 is a perspective view showing an optical coupling device of a first embodiment according to the present invention.
Figure 2:
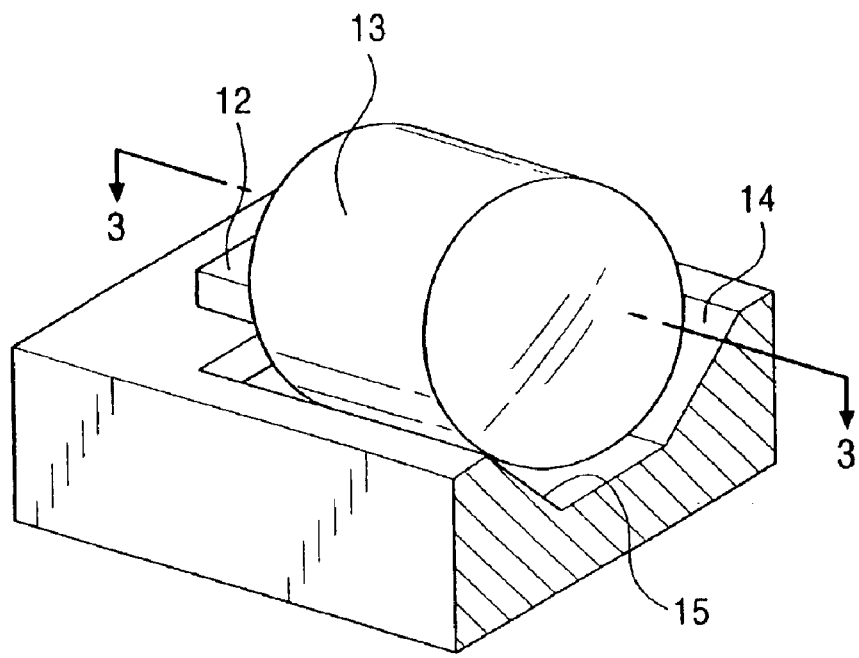
FIG. 2 is a perspective view showing the case in which an LD and a lens are placed on the optical coupling device shown in FIG. 1.
Figure 3:
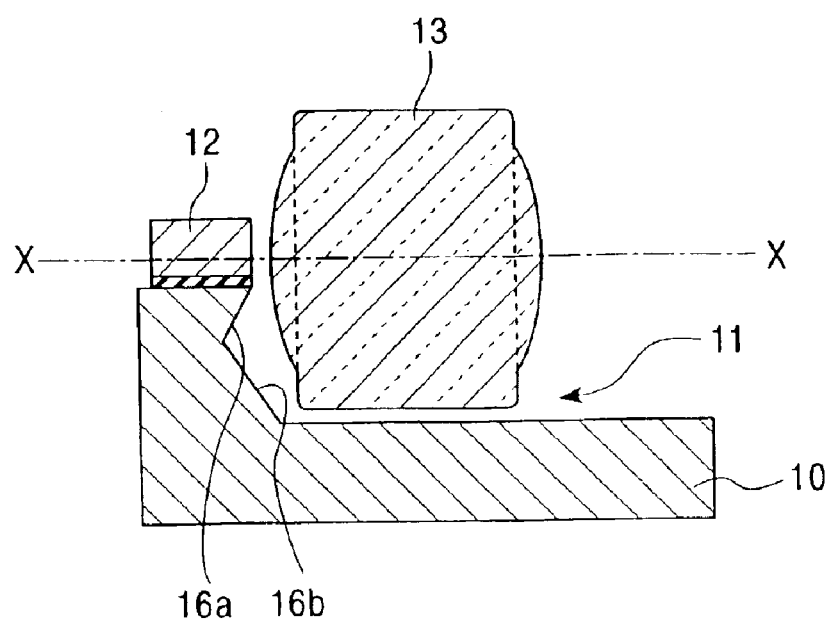
FIG. 3 is a cross-sectional view taken along the line 3—3 shown in FIG. 2.

Hereinafter, a first embodiment of the present invention will be described with reference to FIGS. 1 to 4E. FIG. 1 is a perspective view showing the entirety of an optical coupling device of this embodiment; FIG. 2 is a perspective view showing the state, in which a lens and a light-emitting element (hereinafter referred to as "LD") are placed by using the optical coupling device so as to be coupled with each other, taken along the line 2—2 shown in FIG. 1; FIG. 3 is a cross-sectional view taken along the line 3—3 shown in FIG. 2; and FIGS. 4A to 4E are each cross-sectional view of the optical coupling device in a step of a manufacturing process.

In an optical coupling device 70 of this embodiment, in a front surface having a {100} plane of a single crystal Si substrate 10, a guide groove 11 is formed by anisotropic wet etching for receiving a lens 13. The line X—X shown in FIG. 1 indicates an optical axis, and on one end surface in the optical axis direction, two {111} planes indicated by 16a and 16b are exposed as shown in the figure, and a recessed surface recessed in the optical axis direction is formed. On the other end surface opposing said one end surface, as is the case described above, two {111} planes 17a and 17b indicated by dotted lines are exposed. On two side surfaces parallel to the optical axis direction, other inclined two {111} planes 14 and 15 appear, and the cross section of the guide groove 11 has an inverted trapezoid shape. By the two side surfaces 14 and 15, the alignment of the lens 13 is performed in the radial direction.

The positional relationship between the lens 13 and the LD 12 is as shown in FIG. 3. Since the two {111} planes 16a and 16b forming the end surface of the guide groove 11 are inclined to the side opposite to the lens 13 to form a recessed-end surface recessed in the optical axis direction, the end surface does not prevent the lens 13 from being disposed close to the LD 12, which frequently occurred in the past as is the related example, and as a result, the LD 12 and the lens 13 can be disposed so as to be sufficiently close to each other.

Next, an example of a method for manufacturing the optical coupling device 70 having the structure described above will be described with reference to FIGS. 4A to 4E. In each figure of FIGS. 4A to 4E, a cross-sectional view of the single crystal substrate 10 taken along the optical axis is shown at the left side, and a cross-sectional view taken along the line Y—Y in the figure is shown at the right side.

Figure 4A:
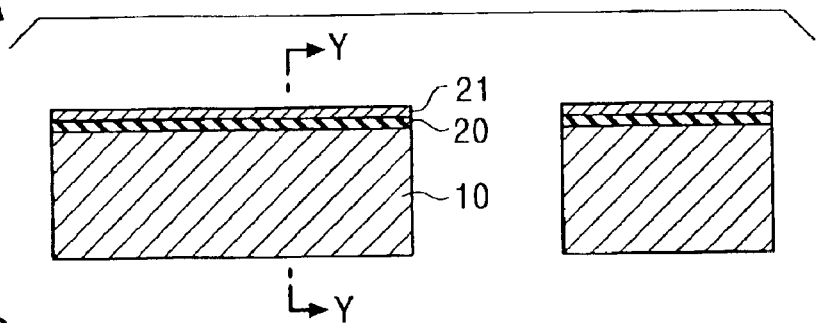
FIGS. 4A to 4E are each cross-sectional view of the optical coupling device shown in FIG. 2 in a step of a manufacturing process.
Figure 4B:
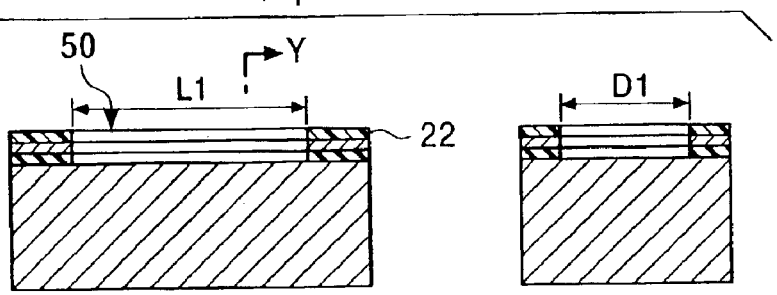

First, as shown in FIG. 4A, on the surface of the single crystal Si substrate 10, a SiO$_2$ film 20 having a thickness of approximately 1,000 Å (0.1 μm) is formed by thermal oxidation or the like. On the surface of the SiO$_2$ film 20, a SiN film 21 having a thickness of approximately 3,000 Å is formed by a CVD method.

Furthermore, a first resist 22 is applied by spin coating, and an opening is formed therein, which is used for forming the guide groove, by patterning. The SiN film 21 and the SiO$_2$ film 20 are etched by using the resist 22 thus patterned as a mask, thereby forming the shape shown in FIG. 4B. A longitudinal dimension L1 and a width D1 of an opening portion 50 at this stage coincide with the length along the optical axis direction and the width of the guide groove 11, which are finally formed in the substrate, at the surface thereof. In the step described above, etching of the SiN film 21 is performed by reactive ion etching (RIE) using SF$_6$ as a reactive gas, and subsequent etching of the SiO$_2$ film 20 is performed by wet etching using a buffered hydrogen fluoride solution.

Figure 4C:
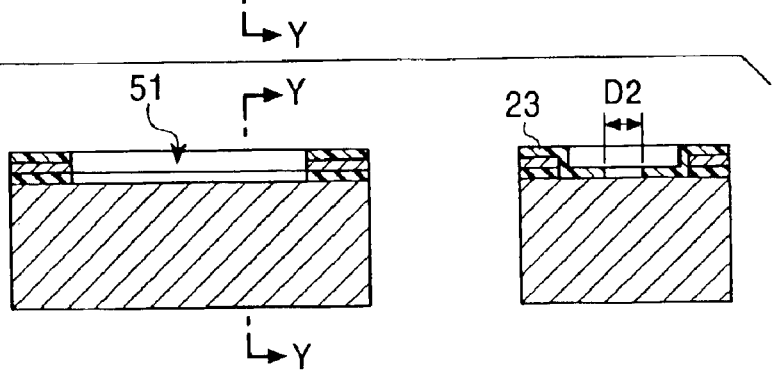

Next, after the first resist 22 is removed, a second resist 23 is applied, and an opening portion is formed therein by patterning, thereby forming the shape shown in FIG. 4C. At this stage, the dimensions of an opening portion 51 are such that the dimension along the optical axis direction is L1, which is equivalent to that of the opening portion 50, and that the dimension in the width direction is D2 which is smaller than D1 in consideration of erosion in the width direction in a subsequent wet etching step. That is, the width D2 is determined so that the two side surfaces 14 and 15 are each formed of a continuous {111} plane over the entire length of the guide groove 11 in the optical axis direction. In particular, when the depth of the groove having the width D2 is represented by D4, the following equation may be held;

$$D1=D2+2\times D4\times \tan(90°-\theta) \qquad -(1)$$

wherein θ indicates an inclined angle of the {111} plane.

Figure 4D:
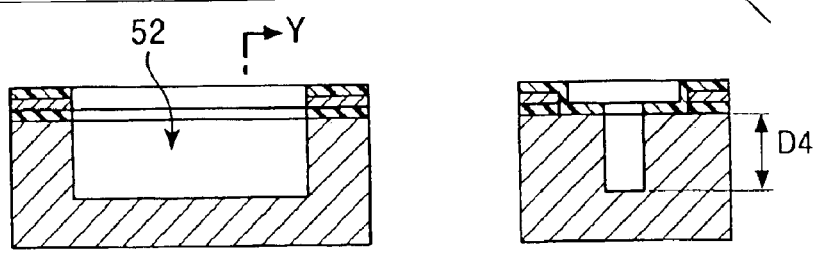
Figure 4E:
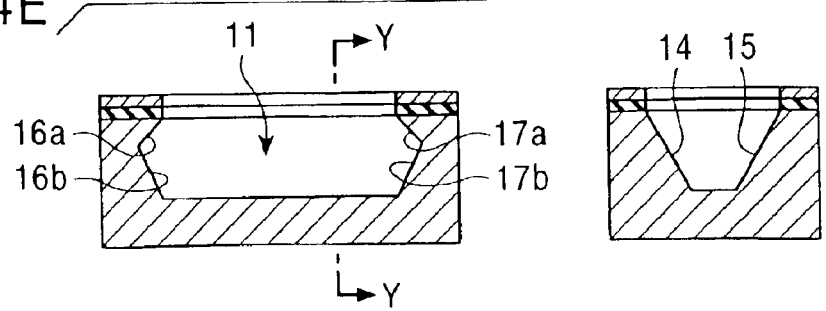

Next, as shown in FIG. 4D, by using the resist 23 as a mask, a rectangular parallelepiped opening portion 52 is formed in the Si substrate 10. In this step, RIE using sulfur hexafluoride (SF$_6$) and perfluoro-1-butene or perfluoro-2-butene or perfluorocyclobutane (C$_4$F$_8$) is performed. As a result, smooth end surfaces can be obtained with high accuracy, in particular in the depth direction, as compared to the case in which general RIE using only SF$_6$ is performed.

Next, after the second resist 23 is removed, the Si substrate 10 is wet-etched by using the SiO$_2$ film 20 and the SiN film 21 as a mask. When a 20% KOH solution is used as an etching solution, and etching is performed at 80° C., an etching rate of approximately 1.5 μm/minute is obtained, whereby the control of the etching can be easily performed.

By this wet etching, on respective end surfaces along the optical axis direction, two {111} planes, 16a and 16b, and 17a and 17b, appear. And as shown in the figure, the planes 16a and 17a are inclined from the upper side toward the substrate side, and the planes 16b and 17b are inclined from the lower side thereto. On each end surface in the width direction, two {111} planes 14 and 15 appear, and the cross-section of the groove has an inverted trapezoid shape. By the shape mentioned above, the lens 13 is aligned in the radial direction.

In addition to those described above, the formation of the opening portion 52 may be performed by laser machining. The accuracy and smoothness of a surface machined thereby are inferior to those obtained by the RIE method described above; however, since a surface processed by wet etching is finally exposed, the influence of the inferiorities mentioned above is not significant, and hence the laser machining may be satisfactorily used as a method that is simpler than RIE.

[Second Embodiment]

Figure 5:
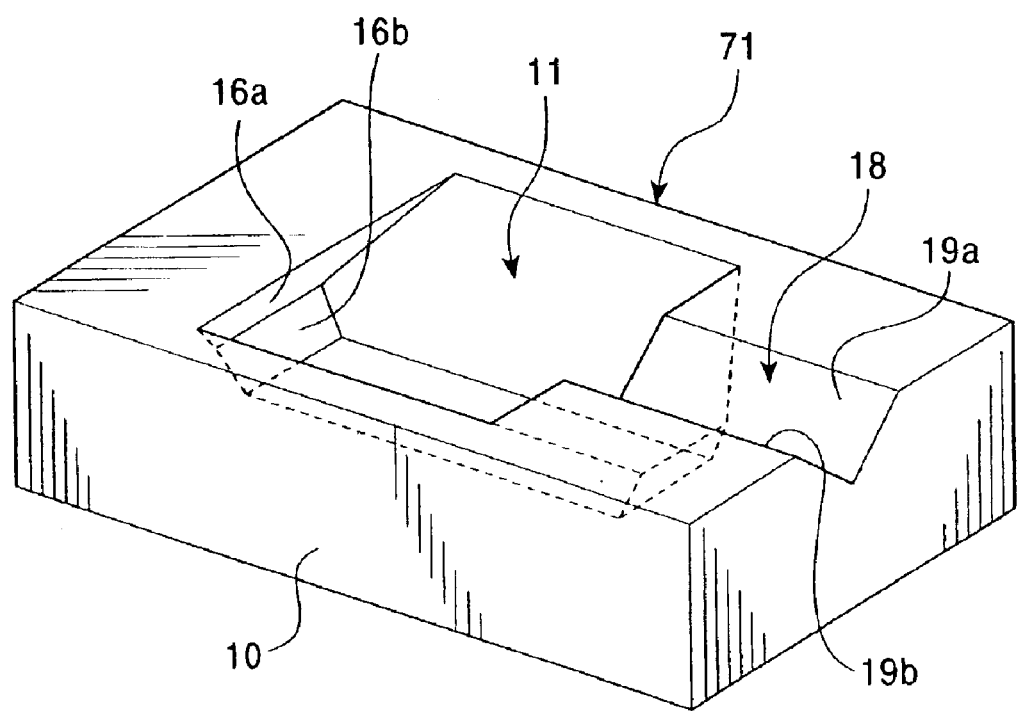
FIG. 5 is a perspective view showing an optical coupling device of a second embodiment according to the present invention.

Hereinafter, a second embodiment of the present invention will be described with reference to FIGS. 5 to 6E. FIG. 5 is a perspective view showing the entirety of an optical coupling device of this embodiment. FIGS. 6A to 6E are each cross-sectional view of an optical coupling device in a step of a manufacturing process. The same reference numerals of the elements in the first embodiment designate the same elements in the second embodiment, and descriptions thereof are omitted.

An optical coupling device 71 of this embodiment is an optical coupling device in which a guide groove 18 used for an optical fiber, which is communicated with the guide groove 11 used for a lens, is provided at a rear side (opposite to the LD 12) of the lens 13 in the first embodiment. A lens can be disposed close to the LD, an optical fiber can be disposed close to the lens, and hence highly efficient optical coupling can be performed. The guide groove 18 is a groove having a V shape, and two side surfaces 19a and 19b both have {111} planes.

The manufacturing method shown in FIGS. 6A to 6E is a method in which the guide groove 18 used for an optical fiber and the guide groove 11 used for a lens can be simultaneously formed. In each of FIGS. 6A to 6E, as is the case of FIGS. 4A to 4E, a cross-sectional view of the single crystal substrate 10 taken along the optical axis is shown at the left side, and a cross-sectional view taken along the line Z—Z in the figure is shown at the right side. In addition, FIGS. 6A to 6E correspond to FIGS. 4A to 4E, respectively. That is, areas shown in FIGS. 6A to 6E, in which the guide groove 11 used for a lens is formed, are processed in the same manner as those described with reference to FIGS. 4A to 4E, respectively.

Figure 6A:
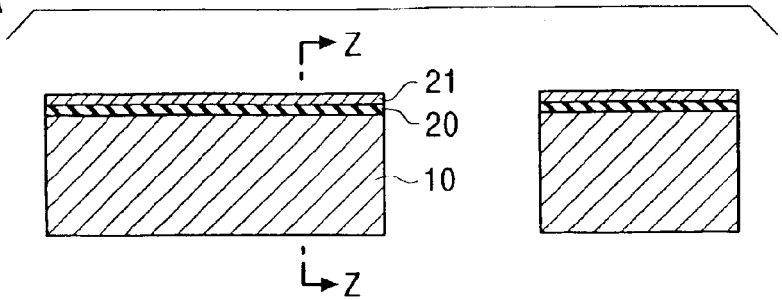
FIGS. 6A to 6E are each cross-sectional view of the optical coupling device shown in FIG. 5 in a step of a manufacturing process.
Figure 6B:
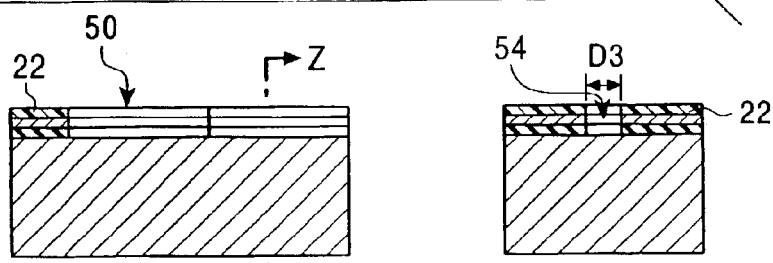

First, as shown in FIG. 6A, after the SiO$_2$ film 20 and the SiN film 21 are formed, the first resist 22 is applied and patterned, and the SiO$_2$ film 20 and the SiN film 21 are then etched by using the resist as a mask to form the shape shown in FIG. 6B. In this step, a width D3 of an opening portion 54 for the guide groove 18 is set to small as compared to the final width of the guide groove 18.

Figure 6C:
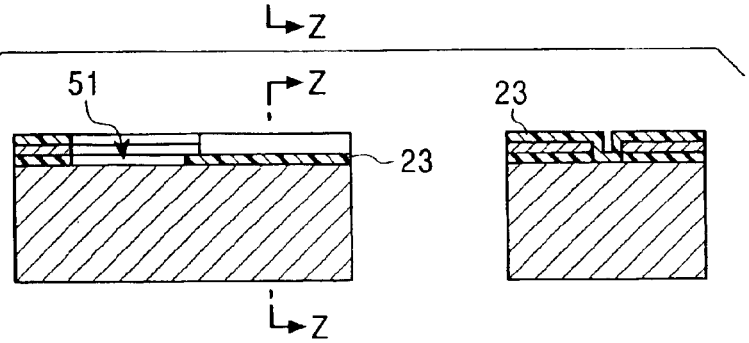

Next, in a manner similar to that shown in FIG. 4C, the second resist 23 is applied and is then patterned, thereby forming the shape shown in FIG. 6C. Since the guide groove 18 used for an optical fiber is not necessary to have a rectangular parallelepiped opening therein before wet etching, the opening portion 54 is covered with the resist 23 at this stage.

Figure 6D:
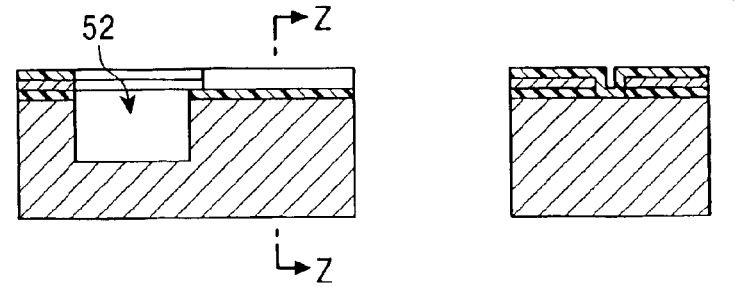
Figure 6E:
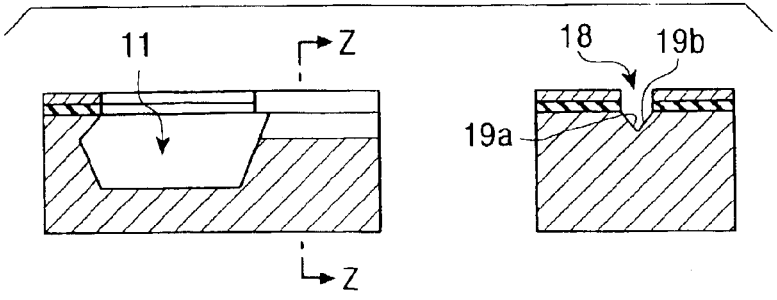
Figure 7:
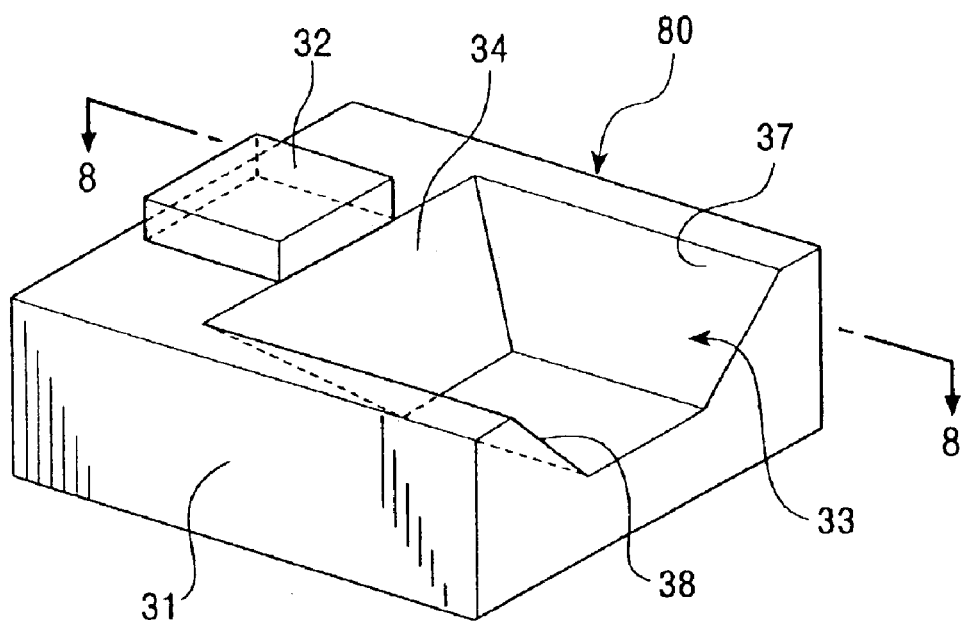
FIG. 7 is a perspective view showing an example of a related optical coupling device.
Figure 8:
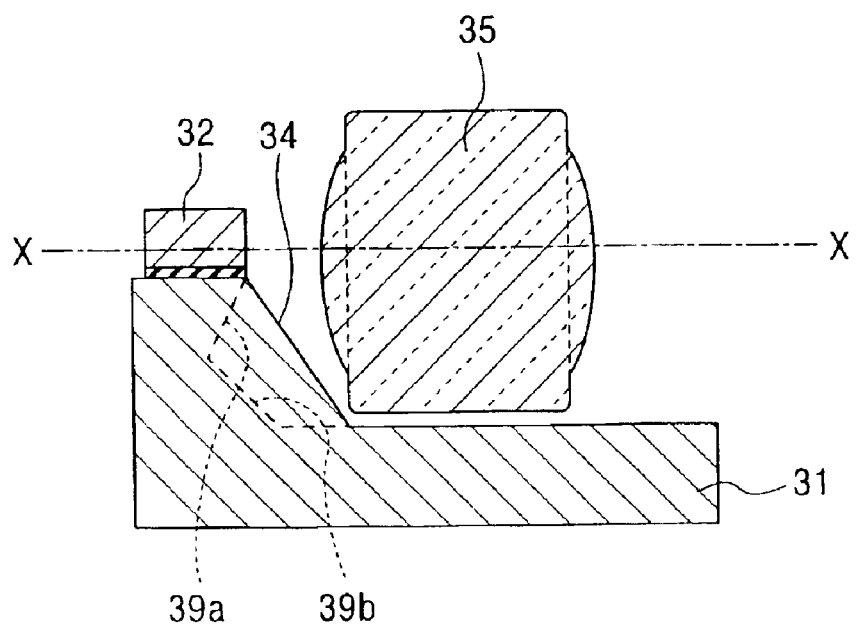
FIG. 8 is a cross-sectional view of the optical coupling device taken along the line 8—8 in FIG. 7.

Next, as shown in FIG. 6D, the rectangular parallelepiped opening 52 is formed by RIE, and the second resist 23 is then removed. Furthermore, by wet etching using a KOH solution, the guide groove 11 used for a lens and the guide groove 18 used for an optical fiber are simultaneously formed. On the two side surfaces of the guide groove 18, {111} planes 19a and 19b appear, and a V-shaped cross-section is formed.

The technical scope of the present invention is not limited to the embodiments described above, and to all coupling devices for coupling optical elements, the present invention may be applied as means for placing individual elements with a predetermined distance therebetween in the optical axis direction.

As has thus been described, in a manner different from the related example of an optical coupling device which is formed of a silicon substrate by wet etching, the optical coupling device of the present invention has a shape in which the bottom part of the end surface in the optical axis direction of the guide groove has no protrusion portion protruding to the inside of the groove. Accordingly, the optical element placed in the guide groove and the other element placed on the substrate can be disposed close to each other, and as a result, highly efficient optical coupling can be obtained. In addition, since the difference in etching rate between the individual crystal planes in wet etching is used, a highly efficient optical coupling device can be manufactured with high reproducibility.

What is claimed is:

1. An optical coupling device comprising:

a single crystal silicon substrate having a {100} plane at a surface; and a guide groove formed in the silicon substrate, in which a first optical element placed in the guide groove is coupled with a second optical element placed outside the guide groove so that the optical axis of the first optical element is aligned with that of the second optical element;

wherein the optical axis has the direction in which a {110} plane is oriented, and at least one end surface of the guide groove in the direction of the optical axis includes two {111} planes which are in contact with each other along one line perpendicular to the optical axis and parallel to the surface at approximately a central portion in the depth direction of the guide groove.

2. The optical coupling device according to claim 1, wherein two side surfaces of the guide groove parallel to the optical axis each have a {111} plane.

3. The optical coupling device according to claim 1, further comprising: an insulating film on the surface of the single crystal silicon substrate; and a metal wire film on the insulating film for the second optical element placed outside the guide groove.

4. A coupling module for optical communication, comprising the optical coupling device according to claim 1, wherein the first optical element is an optical lens, and the second optical element is a light-emitting element or a light-receiving element.

5. A method for manufacturing an optical coupling device, comprising the steps of:

forming a rectangular parallelepiped opening portion in a surface of a single crystal silicon substrate having a {100} plane so that all two pairs of side surfaces opposing each other of the opening portion in the depth direction have {110} planes; and performing anisotropic wet etching for an area which includes the opening portion and is larger than the area thereof in the width direction so as to expose two {111} planes on at least one end surface of the opening portion in the direction in which a {110} plane is oriented, the two {111} planes being in contact with each other along one line which is perpendicular to the direction of the {110} orientation and is parallel to the surface, whereby a guide groove is formed.

6. The method for manufacturing an optics coupling device, according to claim 5, wherein the opening portion is formed by reactive ion etching using sulfur hexafluoride and perfluoro-1-butene or perfluoro-2-butene or perfluorocyclobutane.

7. The optical coupling device of claim 1, wherein the two {111} planes form a concave portion at the at least one end surface of the guide groove in the direction of the optical axis.

8. The method of claim 5, wherein the two {111} planes form a concave portion at the at least one end surface of the guide groove in the direction of the optical axis.

* * * * *